US012803933B2

(12) United States Patent
Kumar et al.

(10) Patent No.: US 12,803,933 B2
(45) Date of Patent: Nov. 17, 2026

(54) SHARING OF HARDWARE-AGNOSTIC PACKET FORWARDING STATE INFORMATION

(71) Applicant: Arista Networks, Inc., Santa Clara, CA (US)

(72) Inventors: Ashwini Kumar, San Jose, CA (US); Ramakrishna Paduvalli, Saratoga, CA (US); Sriram Sellappa, San Jose, CA (US); Suhas Raghunath Joshi, San Jose, CA (US); Andrew Xing Yuan Li, Mountain View, CA (US)

(73) Assignee: Arista Network, Inc., Santa Clara, CA (US)

( * ) Notice: Subject to any disclaimer, the term of this patent is extended or adjusted under 35 U.S.C. 154(b) by 0 days.

(21) Appl. No.: 18/930,272

(22) Filed: Oct. 29, 2024

(65) Prior Publication Data

US 2026/0122009 A1 Apr. 30, 2026

(51) Int. Cl.

*H04L 49/253* (2022.01)
*H04L 49/00* (2022.01)
*H04L 49/901* (2022.01)

(52) U.S. Cl.

CPC ........ *H04L 49/3009* (2013.01); *H04L 49/254* (2013.01); *H04L 49/901* (2013.01)

(58) Field of Classification Search

None

See application file for complete search history.

(56) References Cited

U.S. PATENT DOCUMENTS 9,021,459 B1 * 4/2015 Qu ...................... G06F 11/1484 710/33
11,799,785 B2 * 10/2023 Degrace .............. H04L 47/2483
2003/0189924 A1 * 10/2003 Kadambi ................ H04L 12/46 370/360
2012/0155467 A1 * 6/2012 Appenzeller ........... H04L 45/02 370/392
2015/0006953 A1 * 1/2015 Holbrook ................ H04L 69/40 714/13
2016/0373292 A1 * 12/2016 Sigoure ............... H04L 41/0853
2017/0118042 A1 * 4/2017 Bhattacharya ........ H04L 12/462
2019/0372894 A1 * 12/2019 Schneider ............. H04L 45/036
2022/0052941 A1 * 2/2022 Tang ................... H04L 43/0811
2023/0353489 A1 * 11/2023 Payment ................. G06F 13/28
2024/0314063 A1 * 9/2024 Beecroft ............. G06F 13/1642
2024/0345763 A1 10/2024 Kumar et al.
2024/0385865 A1 * 11/2024 Fonseca ................. G06N 20/00
2025/0039086 A1 * 1/2025 Aggarwal ............... H04L 49/70
2026/0032079 A1 * 1/2026 Beracha .................. H04L 45/28

OTHER PUBLICATIONS

Kumar et al., U.S. Appl. No. 18/326,821, filed May 31, 2023.

* cited by examiner

*Primary Examiner* — Jason D Cardone

(74) *Attorney, Agent, or Firm* — Treyz Law Group, P.C.; Tianyi He

(57) ABSTRACT

A network device may include an active supervisor having processing circuitry that generates hardware-agnostic feature tables that are replicated for a standby supervisor. The processing circuitry of the active supervisor may execute a dedicated state replication process that facilitates the sharing of a packet forwarding state of the active supervisor with the standby supervisor. The shared packet forwarding state may be defined by and include hardware-agnostic feature tables and other types of packet forwarding state information.

20 Claims, 5 Drawing Sheets

SHARING OF HARDWARE-AGNOSTIC PACKET FORWARDING STATE INFORMATION

BACKGROUND

A communication system can include network devices that are interconnected to form a network for conveying network traffic from source devices to destination devices. A network device can be or form part of a modular switching system. Multiple supervisors, such as an active supervisor and a standby supervisor, are often provided in the modular switching system. Operational state information can be shared by the active supervisor with the standby supervisor, in preparation for a stateful switchover between the supervisors.

DETAILED DESCRIPTION

Figure 1:
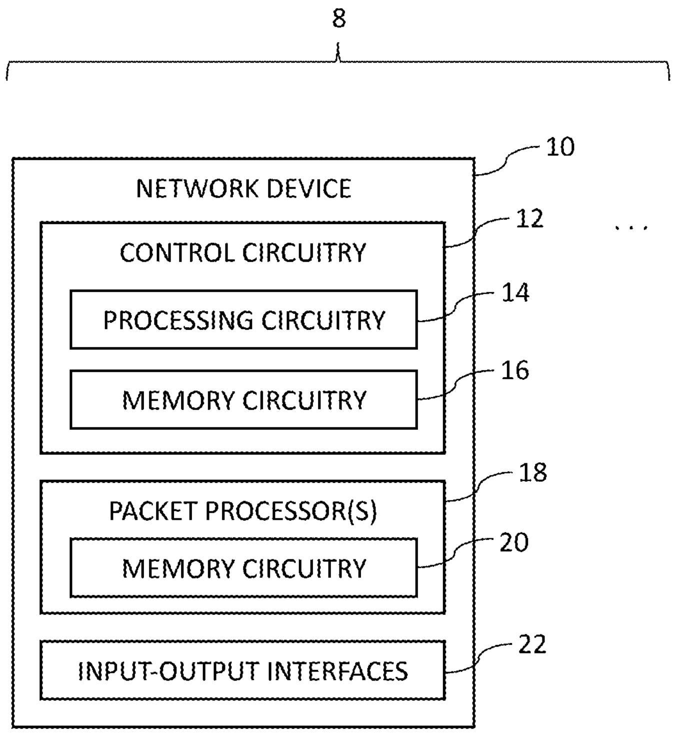
FIG. 1 is a diagram of an illustrative networking system having network device(s) in accordance with some embodiments.

A network may include numerous interconnected network devices that process network traffic in a desired manner. A network device can sometimes include multiple supervisors, one serving as an active supervisor that currently controls the operation of the network device (e.g., packet processors therein) and one serving as a standby supervisor that can take over the role of the active supervisor to control the operation of the network device, e.g., if the currently active supervisor experiences an unexpected failure or during a planned maintenance event of the currently active supervisor. To prepare the standby supervisor to continue the role of the active supervisor after a switchover, the active supervisor may (continually) share its operational state information with the standby supervisor. One illustrative type of operational state information that is shared is packet forwarding state information, which can contain table entries programmed into packet processor memories to facilitate packet processing by the packet processors and/or other information used to produce these table entries.

To efficiently share the packet forwarding state at the active supervisor with the standby supervisor (e.g., replicate the active supervisor packet forwarding state at the standby supervisor), active supervisor processing circuitry (e.g., feature management processes executing thereon) may generate packet-processing-hardware-agnostic tables for packet processing features that can be replicated for the standby supervisor. By sharing the packet-processing-hardware-agnostic tables rather than packet-processing-hardware-specific tables (that are actually in stored packet processor memories), fewer tables may need to be shared because the same packet-processing-hardware-agnostic table can represent multiple versions of packet-processing-hardware-specific tables that would otherwise all need to be shared. The active supervisor processing circuitry may execute a dedicated state replication process that facilitates the sharing of the active supervisor packet forwarding state with the standby supervisor, thereby offloading these operations from individual feature management processes. The packet-processing hardware-agnostic tables and other types of packet forwarding state information defining the packet forwarding state may be shared with the standby supervisor using the state replication process executing on the active supervisor processing circuitry.

An illustrative network 8, which includes one or more network devices each having multiple supervisors that share packet forwarding state (e.g., in the manner described above), is shown in FIG. 1. Network 8 may have any suitable scope. As examples, network 8 may include, be, and/or form part of one or more local segments, one or more local subnets, one or more local area networks (LANs), one or more virtual local area networks (VLANs), one or more datacenter networks, one or more campus area networks, a wide area network, etc. Network 8 may include a wired network portion based on wired technologies or standards such as Ethernet (e.g., using copper cables and/or fiber optic cables) and, if desired, may include a wireless network portion such as one or more wireless local area networks (WLANs) (e.g., wireless networks compliant with the IEEE 802.11 family of standards) provided by wireless access point(s). If desired, network 8 may include internet service provider networks (e.g., the Internet) or other public service provider networks, private service provider networks (e.g., multiprotocol label switching (MPLS) networks), and/or other types of networks such as telecommunication service provider networks.

Network 8 may be implemented using and include one or more network devices that handle (e.g., process by switching, routing, forwarding, modifying, etc.) network traffic to convey information for user applications between end hosts and/or for other applications, services, and functions generally between devices (e.g., network devices and/or end host devices). Network 8 may include networking equipment forming a variety of network devices that interconnect end hosts of network 8. As examples, network devices of network 8 may include one or more wireless access points, one or more switches (e.g., single-layer (Layer 2) switches, multi-layer (Layer 2 and Layer 3) switches, etc.), one or more bridges, one or more routers, one or more gateways, one or more hubs, one or more repeaters, one or more firewalls, one or more devices serving other networking functions, one or more devices that include the functionality of two or more of these devices, and/or management equipment that manages and controls the operation of one or more of other network devices. One such network device of network 8, network device 10, is shown in the example of FIG. 1.

In particular, network device 10 may include control circuitry 12 having processing circuitry 14 and memory circuitry 16, one or more packet processors 18 and corresponding packet processor memory circuitry 20, and input-output interfaces 22 (e.g., network interfaces implemented on exterior-facing ports). In some illustrative configurations sometimes described herein as an example, network device 10 may be or form part of a modular network device system (e.g., a modular switch system having removably coupled modules usable to flexibly expand characteristics and capabilities of the modular switch system such as to increase ports, provide specialized functionalities, etc.). In other configurations, network device 10 may be a fixed-configuration network device (e.g., a fixed-configuration switch having a fixed number of ports and/or a fixed hardware configuration).

Processing circuitry 14 may include one or more processors such as central processing units (CPUs), graphics processing units (GPUs), microprocessors, general-purpose processors, host processors, microcontrollers, digital signal processors, programmable logic devices such as field programmable gate array (FPGA) devices, application specific system processors (ASSPs), application specific integrated circuit (ASIC) processors, and/or other types of processors.

Processing circuitry 14 may run (e.g., execute) a network device operating system and/or other software (including firmware) that is stored on memory circuitry 16. Memory circuitry 16 may include one or more non-transitory (tangible) computer-readable storage media that store the operating system software and/or any other software code, sometimes referred to as program instructions, software, data, instructions, or code. As an example, network device control plane functions may be stored as (software) instructions on the one or more non-transitory computer-readable storage media (e.g., in portion(s) of memory circuitry 16). The corresponding processing circuitry (e.g., one or more processors of processing circuitry 14) may execute the respective instructions to perform the corresponding operations. Memory circuitry 16 may include non-volatile memory device(s) (e.g., solid-state drives, flash memories or other electrically-programmable read-only memories, hard disk drive storage devices, etc.), volatile memory device(s) (e.g., static or dynamic random-access memories), and/or other storage circuitry. Processing circuitry 14 and memory circuitry 16 (e.g., at least some portions of both) as described above may collectively form control circuitry 12 (e.g., implementing a control plane of network device 10). Accordingly, processing circuitry 14 may sometimes be referred to as control plane processing circuitry.

In particular, processing circuitry 14 may execute network device control plane software such as operating system software, routing policy management software, routing protocol agents or processes, routing information base agents, and other control software, may be used to support the operation of protocol clients and/or servers (e.g., to form some or all of a communications protocol stack such as the Transmission Control Protocol (TCP) and Internet Protocol (IP) stack), may be used to support the operation of packet processor(s) 18, may store packet forwarding information, may execute packet processing software, and/or may execute other software instructions that control the functions of network device 10 and the other components therein.

Packet processor(s) 18 may be used to implement a data plane or forwarding plane of network device 10 and may therefore sometimes be referred to herein as data plane processor(s) or data plane processing circuitry. Packet processor(s) 18 may include one or more processors such as application specific integrated circuit (ASIC) processors, programmable logic devices (e.g., field programmable gate array (FPGA) devices), application specific system processors (ASSPs), central processing units (CPUs), graphics processing units (GPUs), microprocessors, general-purpose processors, host processors, microcontrollers, digital signal processors, and/or other types of processors.

A packet processor 18 may receive incoming network packets via input-output interfaces 22 (and/or via device internal interfaces), parse and analyze the received network packets, process the packets based on packet forwarding decision data and/or in accordance with network protocol(s) or other traffic policy, and process, forward (or drop) the network packet accordingly.

To appropriately process network traffic (e.g., network packets), packet processor 18 may operate with memory circuitry 20 (sometimes referred to herein as packet processor memory or packet processor memory circuitry). Packet processor 18 and memory circuitry 20 may be integrated as parts of the same integrated circuit die (or as parts of the same integrated circuit die package), and/or packet processor 18 and memory circuitry 20 may be formed from discrete components, as separate discrete processor and memory components (e.g., as a packet processor integrated circuit die (or die package) and a memory integrated circuit die (or die package)).

Packet processor 18 may process received network traffic based on comparing header information in (and/or packet-processor-generated metadata associated with) the network traffic to flow entries in packet processor memory 20. Each entry may specify one or more matching criteria based on different header fields (and/or metadata fields) and one or more actions to be taken for the matching network traffic (e.g., the network traffic whose header information and/or metadata information satisfies the one or more matching criteria).

To increase the speed at which network traffic is processed by packet processor 18 (e.g., the speed at which the corresponding flow entries are searched or looked up for a match by packet processor 18), packet processor memory circuitry 20 on which flow entries are stored may include ternary content addressable memories (TCAMs). If desired, entries for network traffic matching may be stored in other types of packet processor memory circuitry in addition to or instead of TCAMs, depending on the desired type and/or speed of matching (e.g., if exact match is desired, if minimum speed requirements exist, etc.). As desired, memory circuitry 20 may include non-volatile memory device(s) (e.g., solid-state drives, flash memories or other electrically-programmable read-only memories, hard disk drive storage devices, etc.), volatile memory device(s) (e.g., static or dynamic random-access memories), and/or other storage circuitry.

To interact with external devices, external systems, and/or users, network device 10 may include input-output interfaces 22 formed from corresponding input-output devices (sometimes referred to as input-output circuitry or interface circuitry). Input-output interfaces 22 may include different types of communication interfaces such as Ethernet interfaces (e.g., formed from one or more Ethernet ports), optical interfaces (e.g., formed from optical modules containing optical transceivers), Bluetooth interfaces, Wi-Fi interfaces, and/or other network interfaces for connecting device 10 to the Internet, a local area network, a wide area network, a mobile network, generally network device(s) in these networks, and/or other computing equipment (e.g., end hosts, server equipment, administrator devices, etc.).

As an example, some input-output interfaces 22 (e.g., those based on wired communication) may be implemented on physical ports. These physical ports may be configured to physically couple to and/or electrically connect to corresponding mating connectors of external components or equipment (e.g., cables, pluggable optical transceiver modules, etc.). Different ports may have different form-factors to accommodate different cables, different modules, different devices, or generally different external equipment. As another example, some input-output interfaces 22 (e.g., those based on wireless communication) may be implemented using wireless communications circuitry (e.g., antennas, transceivers, radios, etc.).

In illustrative configuration described herein as an example, network device 10 may include two supervisors. The two supervisors may be implemented in two separate hardware supervisor modules (e.g., each having a separate printed circuit substrate and separate supervisor components, such as processing circuitry, memory circuitry, and input-output interfaces as described in connection with FIG. 1, mounted to or otherwise provided on the printed circuit substrate), or may be implemented as a single hardware supervisor module (e.g., a shared printed circuit substrate on which components of both supervisors are mounted or otherwise provided). Whether implemented in multiple or a single supervisor module(s), the supervisor module(s) of the two supervisors may be coupled to the chassis of a modular network device system (e.g., which is formed at least partly or entirely by device 10). In particular, these two supervisors may form part of the control plane of the modular switch system (e.g., of network device 10).

Figure 2:
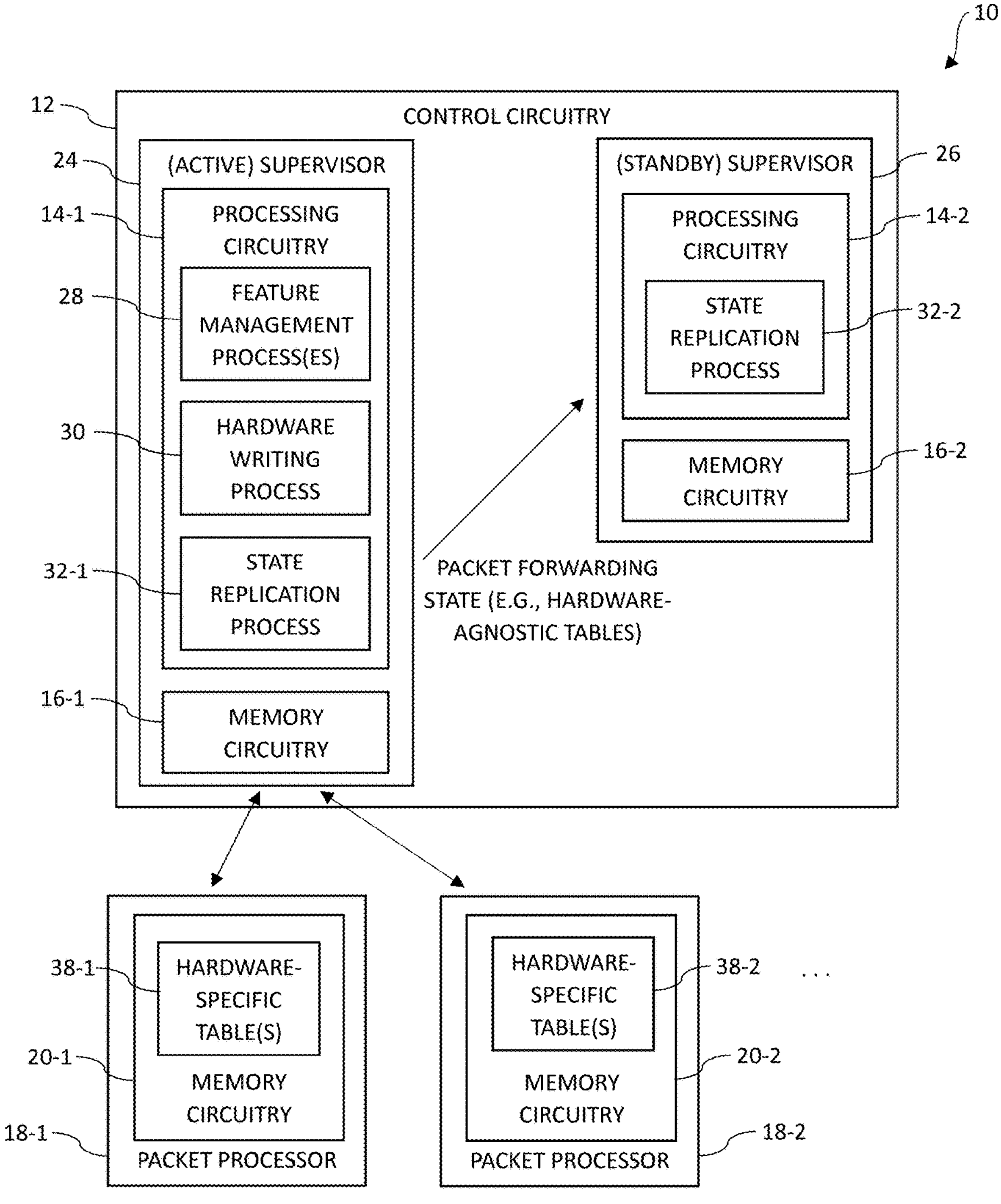
FIG. 2 is a diagram of an illustrative network device that includes multiple supervisors configured to share packet forwarding state in accordance with some embodiments.

FIG. 2 is a diagram of a network device 10 having two illustrative supervisors 24 and 26 (e.g., implemented as one or more hardware supervisor modules). Supervisors 24 and 26 may each include an instance of processing circuitry 14 in FIG. 1 (e.g., processing circuitry 14-1 for supervisor 24 and processing circuitry 14-2 for supervisor 26), may each include an instance of memory circuitry 16 in FIG. 1 (e.g., memory circuitry 16-1 for supervisor 24 and memory circuitry 16-2 for supervisor 26), and, if desired, may each include an instance of other components of device 10 described in connection with FIG. 1 (e.g., input-output interfaces 22).

In some illustrative configurations described herein as an example, supervisors 24 and 26 may have the same elements (e.g., components) and be operable to perform the same (control plane) functions (e.g., when the respective processing circuitry 14 thereof is configured to execute corresponding control plane software instructions). While both supervisors 24 and 26 are configurable and operable to perform the same functions, only one supervisor may actively perform these functions at any given time and is referred to herein as an active supervisor. The active supervisor may change over time (e.g., switch between supervisors 24 and 26).

In the example of FIG. 2 and in other illustrative configurations described herein as examples, supervisor 24 may serve as the active supervisor in control circuitry 12, currently controlling the operation of device 10 (e.g., the components therein). Supervisor 26 may serve as the standby (or backup) supervisor, which, while not currently controlling the operation of device 10, is ready to assume the role of the active supervisor when needed (e.g., when supervisor 24 experiences an expected failure event, during a planned event such as a maintenance or update event for supervisor 24, etc.). Illustrative sets of operations performed by and described herein in connection with (active) supervisor 24 and (standby) supervisor 26, respectively, may change once the roles of these supervisors change. As an example, when supervisor 26 becomes the new active supervisor (and, if desired and applicable, supervisor 24 becomes the new standby supervisor) after a switchover operation, (new active) supervisor 26 may perform the operations described herein to be performed by (previous) active supervisor 24 and (new standby) supervisor 24 may perform the operations described herein to be performed by (previous) standby supervisor 26.

Examples described herein in which device 10 includes two supervisors (e.g., supervisors 24 and 26), one active supervisor and one standby supervisor, are merely illustrative. If desired, device 10 (e.g., control circuitry 12) may include more than two supervisors, one active supervisor and two or more standby supervisors, e.g., with an order of priority among the multiple standby supervisors. In particular, a highest priority (or otherwise selected) standby supervisor of the multiple standby supervisors may be the one to assume the role of the active supervisor when needed. For example, standby supervisor 26 in FIG. 2 may be the highest priority (or otherwise selected) standby supervisor, among multiple standby supervisors in control circuitry 12, that is configured to be ready to assume the role of active supervisor 24 when needed.

It may be desirable to prepare supervisor 26 (or generally a standby supervisor) to take over the control functions of supervisor 24 (or generally an active supervisor) by sharing operational states of (the current active) supervisor 24 with (the current standby) supervisor 26. Doing so may help facilitate a stateful switchover during which (the new active) supervisor 26 continues the operations of (the previous active) supervisor 24 with minimal disruption because much of the operational state information has already been shared with (the new active) supervisor 26 prior to the switchover.

One illustrative type of operational state of supervisor 24 shared with supervisor 26 may be a packet forwarding state (e.g., defined by corresponding packet forwarding state information). The packet forwarding state may include any information that informs or is indicative of how packets are processed (e.g., forwarded) by packet processors 18 of device 10. Such information may include copies of the packet forwarding decision data itself (e.g., entries in packet-processing-hardware tables) stored on packet processor memory circuitry 20 (FIG. 1) and/or the information that produced the packet forwarding decision data.

In illustrative configurations sometimes described herein as an example, processing circuitry 14-1 may run software instructions that implement feature management process(es) 28 (e.g., thereby executing process(es) 28) each managing the implementation of a corresponding traffic processing feature at packet processors 18 (e.g., packet processors 18-1, 18-2, etc.). As just a few examples, packet processing features implemented by processes 28 may include access control list (ACL) policy features, quality of service (QOS) policy features, policy-based routing (PBR) features, traffic mirroring policy features, traffic policing policy features, and/or any other suitable (e.g., lookup-based) traffic processing features. A network traffic processing feature may be implemented by storing entries corresponding to the feature, as a packet-processing-hardware-specific table, in a portion of packet processor memory circuitry 20 and having corresponding packet processor(s) 18 perform corresponding actions for the feature on network traffic matching the match criteria of the entries.

While feature management processes 28 can be configured to generate (packet-processing-) hardware-specific tables for implementing the features and convey the hardware-specific tables, as packet forwarding state information, to supervisor 26, there may be multiple reasons why this may be undesirable. As an example, for a given set of entries for a feature, there may be different representations of the same set of entries for different types of packet processors and/or packet processor memories (sometimes collectively or individually referred to as packet processing hardware). The packet processors and/or packet processor memories may have different hardware functionalities, different hardware limitations, and/or generally different hardware configurations (e.g., include different generations of hardware, include hardware from different manufacturers, etc.) that need to store and process the set of entries differently across the different packet processors and/or packet processor memories. This leads to multiple hardware-specific versions of the same table (e.g., conveying the same information but in different hardware-specific formats) being generated by each process 28. When conveyed to supervisor 26, as packet forwarding state, different versions of the same information leads to redundant information being conveyed.

As another example, while each feature management process 28 can be configured to perform the same replication operations to share its own set of managed hardware-specific tables, this leads to another source of redundancy. As yet another example, each feature management process 28, when configured to perform these replication operations, will do so on top of its core operations associated with feature management and programming (e.g., generation of feature-implementing table entries and programming these table entries into packet processors 18), which can cause performance issues for the performance of these core operations.

To mitigate these issues and/or impart other advantages, supervisor 24 may generate and maintain (packet-processing-) hardware-agnostic information, more specifically (packet-processing-) hardware-agnostic tables and table entries therein (e.g., sets of table entries for implementing the desired traffic processing features), and may convey the hardware-agnostic information, along with other hardware state information representative of packet forwarding state, to supervisor 26. Processing circuitry 14-1 may run software instructions executing a dedicated (packet forwarding) state replication process 32-1 that replicates the hardware state information for multiple features and conveys the replicated information, as packet forwarding state, to supervisor 26, thereby offloading these replication and conveyance operations from individual feature management processes 28. Configured in this manner, process 32-1 can also optimize the replication operations independently from the feature management operations (e.g., by utilizing idle processing circuitry cores, etc.). If desired, a corresponding state replication process 32-2 may be executed on processing circuitry 14-2 of supervisor 26 to receive and process the replicated packet forwarding state information from supervisor 26.

Packet-processing-hardware-agnostic tables (e.g., entries therein) are formatted without consideration of packet processing hardware architecture or type (e.g., packet processor and memory architecture) are therefore formatted in a hardware-generic manner. In contrast, the same hardware-agnostic table may represent multiple packet-processing-hardware-specific tables (e.g., entries therein) that are formatted according to packet processing hardware architecture or type because they ultimately are stored at packet processor memories 20 and used by packet processors 18 (e.g., even if copies may be stored supervisor 24).

Accordingly, the conveyance of tables in the packet-processing-hardware-agnostic format, as forwarding state information, to supervisor 26 may be more efficient, as the conveyance of a single hardware-agnostic table is done in place of the conveyance of the multiple versions of packet-processing-hardware-specific tables 38 derived therefrom. The number of such hardware-specific variants of a single hardware-agnostic table can be quite large as numerous types of packet processors can be included in network device 10 (e.g., in a modular network device system that can be backwards and/or forwards compatible with different line card and different packet processors incorporated over time).

Because feature tables (e.g., table entries implementing packet processing features) may be generated and maintained in the packet-processing-hardware-agnostic format, they still need to be translated or converted into packet-processing-hardware-specific formats specific to each type of packet processor 18 and corresponding memory 20, prior to being written into (e.g., programmed onto) packet processors 18 and corresponding memories 20 of those types. Accordingly, processing circuitry 14-1 may run software instructions executing a hardware writing process 30 (sometimes referred to as a hardware programming process) to perform these conversion (e.g., translation) and writing (e.g., programming) operations. Process 30 therefore may be configured to populate packet processor memory circuitry 20 (e.g., each of packet processor memories 20-1, 20-2, etc.) with its corresponding set of hardware-specific tables 38 (e.g., tables 38-1, 38-2, etc.).

By replicating the packet forwarding state at supervisor 26 (e.g., at least in part by conveying packet-processing-hardware-agnostic information using state replication process 32-1), the sharing of packet forwarding state may be performed more efficiently. Thereafter, when an event (e.g., an unexpected failure event at supervisor 24) triggers a switchover, supervisor 26 may use the replicated packet forwarding state (and other types of states of supervisor 24 replicated at supervisor 26) to continue the control plane operations of supervisor 24 with minimal disruption. In other words, the conveyance of packet forwarding state, including packet-processing-hardware-agnostic information, may help facilitate a stateful switchover from supervisor 24, serving as the active supervisor, to supervisor 26, serving as the new active supervisor.

In general, processing circuitry 14-1 (and processing circuitry 14-2) may each be implemented, organized, and/or configured in any suitable manner to perform feature management, packet-processing-hardware-agnostic table generation, packet processing hardware programming, packet forwarding state replication, replicated packet forwarding state reception and processing, and/or other types of operations as described herein. In other words, if desired, processing circuitry 14-1 (and processing circuitry 14-2) may execute any number processes (e.g., agents) instead of or in addition to processes 28, 30, and 32-1 (and process 32-2) to perform each part of the above-mentioned operations. Accordingly, processing circuitry 14-1 (and processing circuitry 14-2) may sometimes be described herein to perform these operations instead of specifically referring to the one or more agents, processes, and/or kernel executed and implemented thereon.

Figure 3:
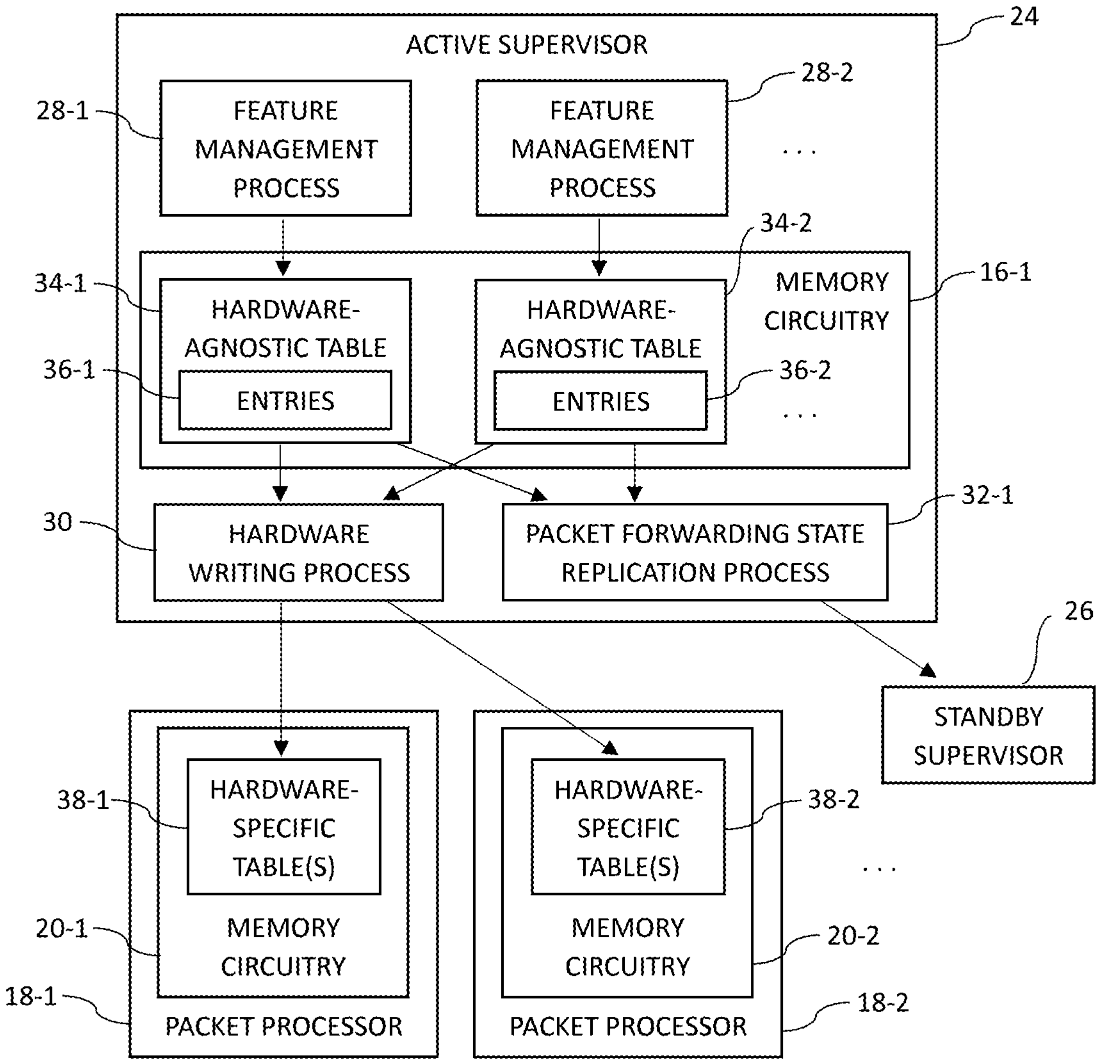
FIG. 3 is an illustrative active supervisor configured to share hardware-agnostic packet forwarding state information with a standby supervisor in accordance with some embodiments.

FIG. 3 is a diagram of a more detailed view of the operations performed by an active supervisor such as supervisor 24 (e.g., performed by active supervisor processing circuitry executing software instructions for corresponding processes). In the example of FIG. 3, multiple instances of feature management process 28 (e.g., processes 28-1, 28-2, etc.) executed on processing circuitry 14-1 (FIG. 2) may each generate one or more corresponding hardware-agnostic tables 34 (e.g., tables 34-1, 34-2, etc., for processes 28-1, 28-2, etc., respectively). Tables 34-1, 34-2, etc., may be maintained (e.g., stored and updated periodically) by process(es) 28-1, 28-2, etc. . . . , respectively, on memory circuitry 16-1 of supervisor 24. Each hardware-agnostic table 34 may represent a set of table entries 36 to be programmed onto packet processors 18 (e.g., packet processors 18-1, 18-2, etc.) for implementing a packet processing feature (e.g., to enable packet processor 18 to handle incoming packets in a particular manner to effectuate the desired behavior of the packet processing feature).

A packet-processing-hardware-agnostic table 34 may include entries 36 that are formatted in a hardware agnostic manner (e.g., in a hardware-agnostic or hardware-generic formal) such that entries 36 and table 34 can be broadly translated for storage (e.g., programming) into a variety of different types of packet processing hardware (e.g., different types of packet processor and/or packet processor memory having different hardware configurations), such as packet processors 18-1, 18-2, etc.

Accordingly, processing circuitry 14-1, e.g., when executing hardware writing process 30, may obtain (e.g., access from memory circuitry 16-1) packet-processing-hardware-agnostic entries 36 for each of the packet processing features (e.g., generated by each feature management process 28) and translate packet-processing-hardware-agnostic entries 36 to corresponding packet-processing-hardware-specific entries for storage in tables 38.

Different translations may be used for different types of packet processing hardware (e.g., processors 18 and/or memory 20). In particular, information indicative of different types of packet processing hardware (e.g., different hardware identifiers such as serial numbers or version numbers, different manufacturer identifiers, etc.) and information indicative of packet processing hardware properties (e.g., formatting requirements for packet processor memory 20, memory architecture of memory 20 such as the number of memory blocks, the width and depth of the memory blocks, types of supported fields or entries, etc., number and/or length of packet processing pipelines in processor 18, types of supported stages in the packet processing pipelines, etc.) may be maintained on memory circuitry 16-1 and/or generally accessible to process 30 to perform translation of tables (e.g., table entries) from the packet-processing-hardware-agnostic format to the packet-processing-hardware-specific format. In other words, entries in the resulting hardware-specific format may take into account (e.g., conform to) the requirements of the packet processing hardware properties.

Accordingly, processing circuitry 14-1 (e.g., when executing hardware writing process 30) may provide each of the generated packet-processing-hardware-specific tables for output to the appropriate packet processor 18. More specifically, processing circuitry 14-1 (e.g., executing process 30) may write each of the generated packet-processing-hardware-specific tables into the appropriate packet processor memory 20 to facilitate its use by the accompanying processor 18 in implementing the functions of the packet processing features associated with the hardware-specific table.

Additionally, processing circuitry 14-1, e.g., when executing packet forwarding state replication process 32-1, may obtain packet-processing-hardware-agnostic tables 34 (e.g., entries 36 therein) for each of the packet processing features (e.g., generated by each feature management process 28) and may replicate these hardware-agnostic tables 34 (e.g., entries 36 therein) for standby supervisor 26. In particular, processing circuitry 14-1 may share copies of each packet-processing-hardware-agnostic table 34 with standby supervisor 26 such that packet forwarding state of supervisor 24 can be replicated at supervisor 26.

Figure 4:
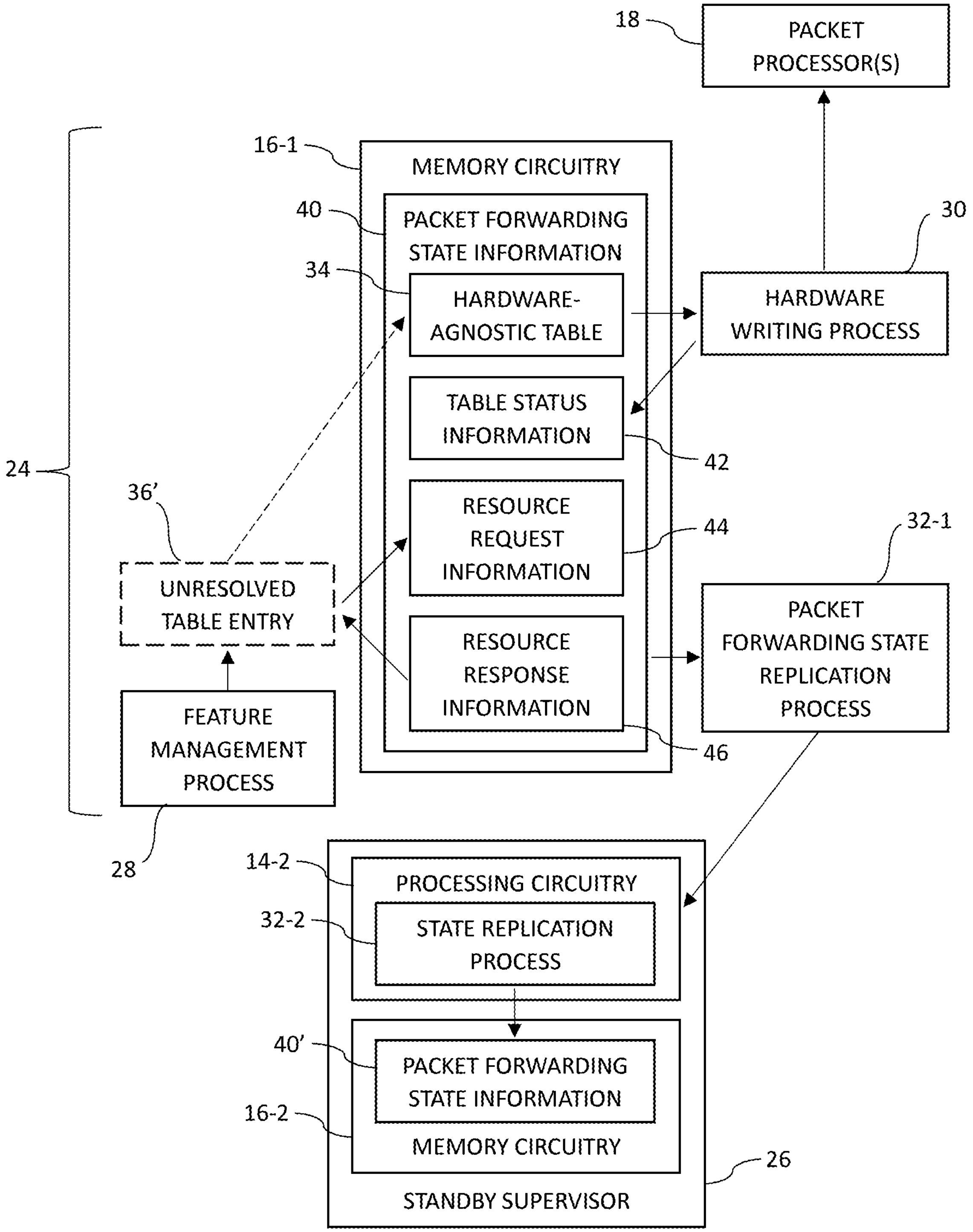
FIG. 4 is an illustrative active supervisor configured to share multiple types of packet forwarding state information in accordance with some embodiments.

If desired, packet forwarding state information may include other information (e.g., information other than each hardware-agnostic table representing tables to be programmed in corresponding packet processing hardware to implement each of the features). FIG. 4 is a diagram of an illustrative active supervisor configured to maintain different types of packet forwarding state information that can be replicated at a standby supervisor, to further define the packet forwarding state.

As shown in FIG. 4, memory circuitry 16-1 may maintain packet forwarding state information 40 for a given feature. Packet forwarding state information 40 may include packet-processing-hardware-agnostic table(s) 34 generated and maintained by process 28 (e.g., as described in connection with FIG. 3). Packet forwarding state information 40 may further include table status information 42 such as information indicative of the packet processing hardware programming status of hardware-agnostic table(s) 34, information indicative of which of entries 36 (FIG. 3) of table(s) 34 have been programmed into packet processing hardware (e.g., packet processor memory 20 in FIG. 3) and/or which of entries 36 of table(s) 34 have not been programmed into packet processing hardware, information indicative of table programming errors, etc. In some illustrative configurations, table status information 42 may be organized into one or more tables (e.g., storing indications of entries that have been written into packet processing hardware and/or entries that have not yet been written into packet processing hardware) and these table(s) may be referred to as table status table(s).

In particular, processing circuitry 14-1 (FIG. 2), when executing hardware writing process 30, may update table status information 42 by providing an indication (e.g., an acknowledgement) of when translation of a corresponding hardware-agnostic table 34 (e.g., one or more entries 36 therein) and subsequent programming of the translated hardware-specific table(s) into one or more packet processors 18 have been completed. If desired, hardware writing process 30 may update table status information 42 with other types of information (e.g., programming failure, programming progress information, etc.).

Packet forwarding state information 40 may also include resource request information 44 and resource response information 46 (sometimes collectively or individually referred to as resource resolution status information). In particular, these resource(s) being requested and being provided in corresponding responses may refer to information used to resolve dependencies and/or other issues in incomplete (e.g., unresolved) table entries generated by feature management process 28. In the example of FIG. 4, processing circuitry 14-1, when executing feature management process 28, may generate an unresolved table entry 36'. In particular, entry 36' may include unresolved information (e.g., an unresolved dependency) such as a missing parameter or value in the entry that is inaccessible to this feature management process 28 (e.g., a parameter or value managed by another feature management process 28 for another feature or generally information local to another process executing on processing circuitry 14-1).

Based on the unresolved information, feature management process 28 may convey a resource request which is stored as part of resource request information 44 (e.g., stored as a table of resource requests). Another entity (e.g., another process such as another feature management process 28) may obtain the resource request stored as part of information 44 and respond with the corresponding resource response. The corresponding resource response may be stored as resource response information 46 (e.g., stored as a table containing resource responses). Feature management process 28 may resolve table entry 36' (e.g., the previously missing parameter or value) using the resource in the corresponding resource response and populate hardware-agnostic table 34 with the resolved version of table entry 36' (e.g., with obtained resource populating the initially missing information).

Processing circuitry 14-1, e.g., when executing state replication process 32-1, may obtain each of these different types of packet forwarding state information 40 for replication and output to standby supervisor 26. In particular, processing circuitry 14-1, e.g., when executing state replication process 32-1, may output, via one or more output interfaces (e.g., output paths) of supervisor 24 for standby supervisor 26, the different types of packet forwarding state information 40 to processing circuitry 14-2 of standby supervisor 26. In illustrative configurations sometimes described herein as an example, a state replication process 32-2 executing on processing circuitry 14-2 may obtain the replicated packet forwarding state information and store the replicated packet forwarding state information 40' locally at memory circuitry 16-2 of standby supervisor 26. In such a manner, supervisor 26 may be configured to perform a stateful switchover (e.g., replacing supervisor 24 as the active supervisor) using (at least in part) information 40' representing packet forwarding state of supervisor 24 prior to the switchover.

While illustrative packet forwarding state information for a single feature (e.g., managed by a corresponding feature management process 28) is shown in the example of FIG. 4, this example is merely illustrative. In general, each of the multiple feature management processes 28 (FIG. 3) may maintain a corresponding set of packet forwarding state information 40 for its managed feature. Packet forwarding state information 40 for each of these features (e.g., each maintained by a different feature management process 28) may be accessible to and may be obtained and replicated by the same packet forwarding state replication process 32-1 for output to standby supervisor 26. Accordingly, the replicated local copy of packet forwarding state information 40' on memory circuitry 16-2 may similarly include packet forwarding state information for each of the feature management processes 28 implemented on supervisor 24, thereby (fully or substantially) defining the packet forwarding state of supervisor 24.

Processing circuitry 14-1, e.g., when executing state replication process 32-1, may obtain (e.g., receive, aggregate, etc.) information 40 for each of the packet processing features in any suitable manner, e.g., for replication and output to supervisor 26. As examples, processing circuitry 14-1, e.g., executing process 32-1 may replicate and output different types of information 40 as batches of data when the corresponding type of state information 40 is initially generated and/or may replicate and output updates to the previously replicated and output version of state information 40' (e.g., addition, deletion, and/or modification of data in information 40 such as one or more table entries of table 34, status changes in information 42, changes to resource requests in information 44, changes to resource responses in information 46, etc.).

In particular, when the maintained information 40 is updated, memory circuitry 16-1 may be configured to provide process 32-1 with a notification of the update, thereby causing process 32-1 to obtain (e.g., fetch) the changes made in the update, and replicate the changes for output to supervisor 26. In general, regardless of timing, the entirety of information 40 and updates to information 40 may be replicated and conveyed to standby processor 26. If desired, certain types of information (e.g., resource resolution information 44 and 46) in information 40 may be omitted and/or changed to convey other types of packet forwarding state information. If desired, additional types of packet forwarding state information may be included as information 40.

While, in connection with at least some examples described herein (e.g., in connection with FIGS. 2-4), supervisor 24 (e.g., processing circuitry 14-1) has been described to perform the operations in connection with feature management process 28, hardware writing process 30, and state replication process 32-1, these operations (and other similar operations) may be performed by supervisor 24 in its capacity (role) as the active supervisor. Accordingly, once supervisor 26 takes over as the new active supervisor (e.g., after a switchover operation), the new active supervisor 26 (e.g., processing circuitry 14-2) may then perform the operations in connection with feature management process 28, hardware writing process 30, and state replication process 32-1 (and other similar operations) its capacity (role) as the (new) active supervisor. Analogously, while, in connection with at least some examples described herein (e.g., in connection with FIGS. 2-4), supervisor 26 (e.g., processing circuitry 14-2) has been described to perform the operations in connection with state replication process 32-2, these operations (and other similar operations) may be performed by supervisor 26 in its capacity (role) as the standby supervisor. Accordingly, once supervisor 24 (or another supervisor) becomes the new standby supervisor (e.g., after the switchover operation, and/or after recovering from the failure event or after completing the maintenance event causing the switchover operation), the new standby supervisor 24 (e.g., processing circuitry 14-1) may then perform the operations in connection with state replication process 32-2 (and other similar operations) its capacity (role) as the (new) standby supervisor.

Figure 5:
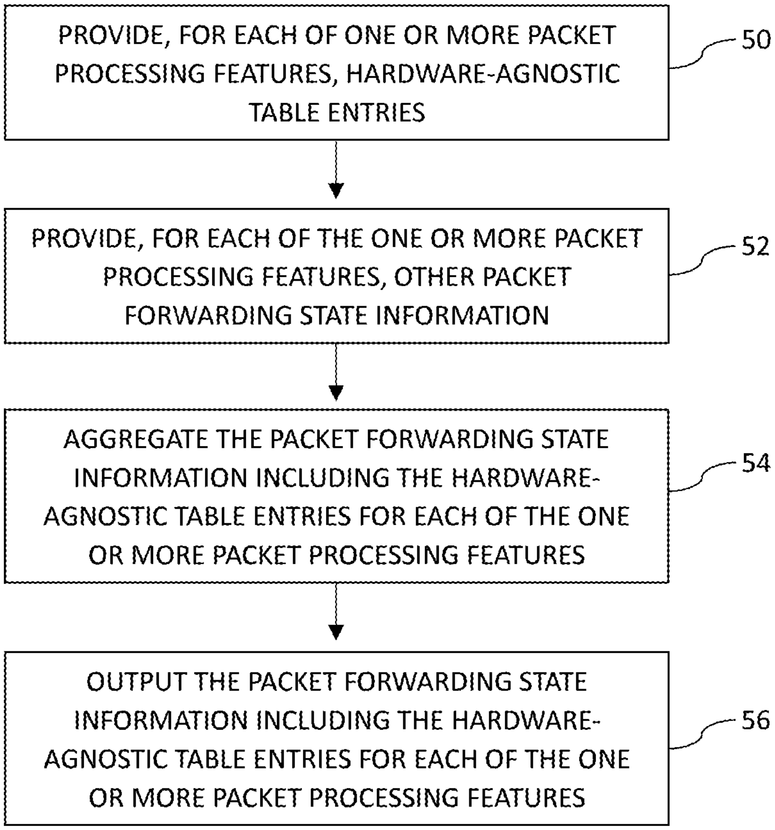
FIG. 5 is a flowchart of illustrative operations for sharing packet forwarding state in accordance with some embodiments.

FIG. 5 is a flowchart of illustrative operations for sharing packet forwarding state (e.g., between supervisors such as an active supervisor and a standby supervisor). In particular, these operations may be performed by one or more processors of network device 10 (e.g., processing circuitry 14-1 of supervisor 24 serving as the active supervisor in FIG. 2) using other components of network device 10 (e.g., other components of supervisor 24 in FIG. 2 such as memory circuitry 16-1, supervisor input-output interfaces, components of supervisor 26 in FIG. 2 etc.). In some configurations described herein as an illustrative example, at least some of the operations described in connection with FIG. 5 may be performed by one or more processors (e.g., of processing circuitry 14-1) executing software instructions stored on memory circuitry (e.g., one or more non-transitory computer-readable storage media of memory circuitry 16-1). If desired, one or more operations described in connection with FIG. 5 may be performed by and/or use dedicated hardware processors of network device 10 (e.g., of supervisor 24).

At block 50, one or more processors (e.g., a central processing unit for an active supervisor on a hardware supervisor module) may provide, for each of one or more packet processing features, packet-processing-hardware-agnostic table entries for implementing the packet processing feature. The hardware-agnostic table entries may form one or more corresponding hardware-agnostic tables for implementing the packet processing features.

These hardware-agnostic tables (e.g., entries therein organized in a hardware-generic or hardware-agnostic format) may not be directly usable by packet processing hardware (e.g., packet processors and packet processor memories). Accordingly the one or more processors may translate the hardware-agnostic table entries into a first version of packet-processing-hardware specific table entries that are programmable into or usable by a specific (first) type of packet processing hardware (e.g., a first set of one or more packet processors and corresponding memories therein), may translate the hardware-agnostic table entries into a second version of packet-processing-hardware specific table entries that are programmable into or usable by a specific (second) type of packet processing hardware (e.g., a second set of one or more packet processors and corresponding memories therein), etc.

While packet-processing-hardware-agnostic tables (e.g., entries therein) are not in a format usable by packet processing hardware, they may be maintained (e.g., stored even after the corresponding hardware-specific tables have been generated) to facilitate other operations such as efficient sharing of packet forwarding state with a backup supervisor. Packet-processing-hardware-agnostic tables or table entries may generally be a more compact representation of packet forwarding state than hardware-specific tables or table entries.

At block 52, the one or more processors may provide, for each of the one or more packet processing features, other packet forwarding state information. As examples, the one or more processors may maintain table status information indicative of a hardware programming state of the hardware-agnostic table entries and may maintain resource resolution status information (e.g., resource request and response information) for resolving dependencies and/or other issues in some hardware-agnostic table entries prior to them being provided at block 50.

At block 54, the one or more processors may aggregate, e.g., at a dedicated packet forwarding state replication process executing thereon, the packet forwarding state information, including the hardware-agnostic table entries for each of the one or more packet processing features (provided at block 50) and any other types of packet forwarding state information (provided at block 52).

At block 56, the one or more processors may convey (a replicated version of) the packet forwarding state information, including the hardware-agnostic table entries for each of the one or more packet processing features as output (e.g., to a standby supervisor or if desired another entity that provides redundancy or backup).

The methods and operations described above in connection with FIGS. 1-5 may be performed by the components of one or more network devices and/or one or more servers or other host equipment in a network using software, firmware, and/or hardware. Software code for performing these operations may be stored on one or more non-transitory computer-readable storage media (e.g., tangible computer-readable storage media) stored on one or more of the components of the network device(s) and/or server(s) or other host equipment. The software code may sometimes be referred to as software, data, instructions, program instructions, or code. The one or more non-transitory computer-readable storage media may include drives, non-volatile memory such as non-volatile random-access memory (NVRAM), removable flash drives or other removable media, other types of random-access memory, etc. Software stored on the non-transitory computer readable-storage media may be executed by processing circuitry on one or more of the components of the network device(s) and/or server(s) or other host equipment (e.g., processing circuitry of network devices, compute devices of server equipment, processing circuitry of computing devices, etc.).

The foregoing is merely illustrative and various modifications can be made to the described embodiments. The foregoing embodiments may be implemented individually or in any combination.

What is claimed is:

1. A network device supervisor operable as an active supervisor in a network device, the network device supervisor comprising:
- memory circuitry; and
- processing circuitry coupled to the memory circuitry and configured to:
  - maintain hardware-agnostic table entries for a packet processing feature;
  - provide, as output to a packet processor in the network device, hardware-specific table entries translated from the hardware-agnostic table entries, wherein the hardware-specific table entries provided as output to the packet processor are stored on a packet processor memory for the packet processor and are usable by the packet processor to process network traffic; and
  - provide, as output to a standby supervisor in the network device, the hardware-agnostic table entries, wherein the hardware-agnostic table entries provided as output to the standby supervisor are different from the hardware-specific table entries translated from the hardware-agnostic table entries and stored on the packet processor memory.

2. The network device supervisor defined in claim 1, wherein the processing circuitry is configured to provide, as output for an additional packet processor in the network device, additional hardware-specific table entries translated from the hardware-agnostic table entries and wherein the hardware-agnostic table entries provided as output to the standby supervisor are different from the additional hardware-specific table entries translated from the hardware-agnostic table entries.

3. The network device supervisor defined in claim 2, wherein the packet processor is a first type of packet processor and wherein the additional packet processor is a second type of packet processor.

4. The network device supervisor defined in claim 3, wherein the hardware-specific table entries are translated from the hardware-agnostic table entries based on the first type of packet processor, wherein the additional hardware-specific table entries are translated from the hardware-agnostic table entries based on the second type of packet processor, and wherein the hardware-specific table entries and the additional hardware-specific table entries are formatted differently.

5. The network device supervisor defined in claim 1, wherein the processing circuitry is configured to provide the hardware-agnostic table entries as packet forwarding state information and is configured to provide, as additional output for the standby supervisor, additional packet forwarding state information.

6. The network device supervisor defined in claim 5, wherein the additional packet forwarding state information comprises hardware-agnostic table status information indicative of hardware programming status of the hardware-agnostic table entries.

7. The network device supervisor defined in claim 5, wherein the additional packet forwarding state information comprises status information associated with resource resolution for resolving missing information in a hardware-agnostic table entry.

8. The network device supervisor defined in claim 1, wherein the hardware-specific table entries, when stored on the packet processor memory for the packet processor and used to process the network traffic, implements the packet processing feature.

9. A supervisor module operable in a modular network device system, the supervisor module comprising:
memory circuitry; and
processing circuitry coupled to the memory circuitry and configured to:
store packet forwarding state information for a plurality of packet processing features; and
execute a state replication process that obtains the packet forwarding state information for the plurality of packet processing features and that replicates the packet forwarding state information for the plurality of packet processing features for output to a standby supervisor, wherein the packet forwarding state information replicated for output to the standby supervisor comprises information in a format that is generic to different types of packet processors, wherein the information is translated into a first hardware-specific format when programming a first type of packet processor, and wherein the information is translated into a second hardware-specific format when programming a second type of packet processor.

10. The supervisor module defined in claim 9, wherein the packet forwarding state information replicated for output to the standby supervisor comprises table entries in the format that is generic to different types of packet processors.

11. The supervisor module defined in claim 10, wherein the processing circuitry is configured to maintain the table entries in the memory circuitry and wherein the state replication process is configured to replicate the table entries from the memory circuitry for output to the standby supervisor.

12. The supervisor module defined in claim 10, wherein the processing circuitry is configured to execute a hardware writing process that translates the table entries, in the format generic to different types of packet processors, each to one or more table entries in one or more corresponding hardware-specific formats, each for a different type of packet processor.

13. The supervisor module defined in claim 12, wherein the hardware writing process writes a first table in the first hardware-specific format into a first packet processor memory for the first type of packet processor and writes a second table in the second hardware-specific format into a second packet processor memory for the second type of packet processor and wherein the first and second tables are translated from a same table in the format generic to different types of packet processors.

14. The supervisor module defined in claim 9, wherein the packet forwarding state information replicated for output to the standby supervisor comprises hardware table programming status information for the plurality of packet processing features.

15. The supervisor module defined in claim 9, wherein the packet forwarding state information replicated for output to the standby supervisor comprises resource request and response information for resolving dependencies in table entries for the plurality of packet processing features.

16. The supervisor module defined in claim 9, wherein the processing circuitry is configured to execute a plurality of feature management processes, each configured to manage the packet forwarding state information for a corresponding packet processing feature of the plurality of packet processing features.

17. A network device comprising:
a first supervisor that serves as an active supervisor and includes memory circuitry and processing circuitry coupled to the memory circuitry; and
a second supervisor that serves as a standby supervisor, wherein the processing circuitry of the first supervisor is configured to execute a plurality of packet processing feature management processes and a state replication process that replicates a packet forwarding state of the first supervisor at the second supervisor, wherein the packet forwarding state replicated at the second supervisor comprises packet-processing-hardware-agnostic table entries provided by the packet processing feature management processes, wherein the packet-processing-hardware-agnostic table entries, when translated into additional table entries of a first hardware-specific format, is usable to program a first packet processor, and wherein the packet-processing-hardware-agnostic table entries, when translated into additional table entries of a second hardware-specific format different from the first hardware-specific format, is usable to program a second packet processor.

18. The network device defined in claim 17, wherein the first and second packet processors have different packet processing hardware properties.

19. The network device defined in claim 17, wherein the second supervisor includes additional memory circuitry and additional processing circuitry coupled to the additional memory circuitry and wherein the additional processing circuitry of the second supervisor is configured to execute an additional state replication process that receives, from the first supervisor, information indicative of the packet forwarding state and stores the received information locally on the additional memory circuitry.

20. The network device defined in claim 19, wherein the information indicative of the packet forwarding state stored locally on the additional memory circuitry is usable to facilitate a stateful switchover from the first supervisor serving as the active supervisor to the second supervisor serving as the active supervisor.

* * * * *